Patented Oct. 1, 1940

2,216,618

UNITED STATES PATENT OFFICE 2,216,618

SURFACE ACTIVE ANIONIC BORIC ACID ESTER COMPOUNDS OF AMINO ALCOHOLS

Jacob Katz, Providence, R. I.

No Drawing. Application August 10, 1939, Serial No. 289,433

9 Claims. (Cl. 260—401)

This application is a continuation in part of application Serial No. 227,665, filed August 31, 1938, for Surface active anionic compounds of amino alcohols.

My present invention relates to new products obtainable by the reaction of fatty acids containing at least eight carbon atoms with alkylol amines to form alkylol amides and condensing the alkylol amides with boric acid to form acid esters. These substances are compounds with characteristic "mousy" odor, and are insoluble in water and petroleum ether, but are soluble in alcohol, ethyl ether, ortho-dichloro benzene, and other organic solvents. They may be made water soluble by treatment with an esterifying agent such as sulphuric acid, chlor-sulfonic acid, and various inorganic and organic reagents which are capable of reacting with the secondary or primary hydroxyl group of the alkylol amide to form water soluble amide derivatives. The resulting compounds may be neutralized with either organic or inorganic basic substances.

These water soluble alkylol amides have excellent wetting, detergent, and softening properties and may be used in various processing steps in the textile and allied industries. They have exceptional stability in highly acid solutions as well as strongly basic solutions, and may be used in acid dyeing, basic dyeing, mercerising, finishing, etc.

I prepare these new derivatives by heating the fatty acid and alkylol amine to form the corresponding alkylol amide, condensing same with boric acid and treating the resulting compound with an esterifying agent wherein the corresponding "ate or onate" compound is formed, an example of a typical compound being lauryl boro iso-propanol amide sulphate.

The fatty acids may be capric, lauric, undecylenic, myristic, palmitic, oleic, ricinoleic, stearic, dihydroxy stearic, erucic, stearylgluconic acid, sebacic, and various derivatives of these compounds. Other mono basic and dibasic acids can also be used, including those of the aromatic, hydroaromatic, cyclic and heterocyclic compounds, examples of which are benzoic acid, abietic acid, naphthenic acid, quinaldine carboxylic acid, phenylstearic acid, tolylstearic acid, xylylstearic acid, chlorophenylstearic acid, alpha naphtylstearic acid.

The alkylol amines of the present process belong to that class of chemical compounds which are known as the amine derivatives of primary and secondary alcohols. The alkylol amines may also contain various substituted groupings such as alkyl, aryl, aralkyl, which can easily be made by the reaction of chlor nitro alcohols with the appropriate cyclic compounds to form arylated nitro alcohols which may be reduced to alkylol amines.

The following are examples of such compounds: mono-isopropanol amine, 1-amino-2-hydroxybutane, 1-amino-3-methyl-2-butanol, 8-amino-2-hydroxy octanol, glucoseamine, glycerol amine and their derivatives, diethanol amine, di-iso propanol amine, 2-amino-3-hexanol, 3-amino-4-heptanol, 2-amino-1-pentanol, 5-amino-4-octanol, 2-amino-2-methyl-1-propanol, 3-amino-3-methyl-2-butanol, 2-amino-2-methyl-3-hexanol, 2-amino-2-methyl-1-butanol, 3-amino-3-methyl-4-heptanol, 3-amino-2-methyl-4-heptanol, 2-amino-2-methyl-1,3-propanediol, 2-amino-2-ethyl-1,3-propanediol, 2-amino-2-propyl-1,3-propanediol, 2-amino-2-isopropyl-1,3-propanediol, trimethylol aminomethane. Many of the derivatives being easily available by the reaction of nitro paraffin with aldehyde followed by reduction with hydrogen.

The reaction between the carboxylic acid and the alkylol amine may be written as follows:

EQUATION #1

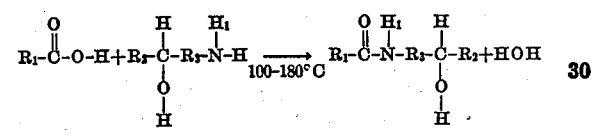

Carboxylic  Alkylol                    Alkylol amide  Water
acid        amine

The reaction between the alkylol amide and the esterifying agent, i. e., boric acid, is somewhat complicated due to the many side reactions which are possible, but the main reaction may be expressed as follows:

EQUATION #2

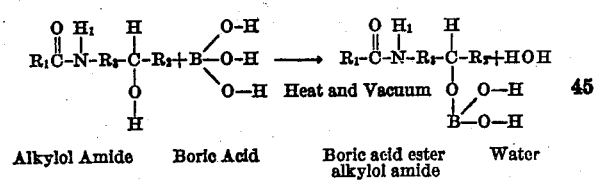

Alkylol Amide    Boric Acid    Boric acid ester    Water
                               alkylol amide In the above reactions, $R_1$ is a hydrocarbon grouping containing from eight to 22 carbon atoms, $R_2$ may be a hydrogen atom or an alkyl, aryl, alkyl-aryl grouping containing various radicles, $R_3$ is a hydrocarbon of a low molecular weight, O is oxygen, H is hydrogen, $H_1$ is a hydrogen atom or a hydrocarbon radicle or an alkylol group.

The hydroxy groups of these long chain hydroxy fatty amides are borated to form the boric acid esters, which upon proper treatment with sulfuric acid yield water soluble derivatives. The quantity of boric acid will depend entirely upon the number of hydroxy groups present in the fatty hydroxy amide. If the derivative contains 1 hydroxy grouping, 3 mols of amide per mol of boric acid or 1 mol amide per mol of boric acid may be used. In this way the ortho and metaboric acid esters may be obtained, as well as the intermediate products between them, which apparently consist of mixtures of the compounds.

The reaction is carried out by slowly heating the mixture of the hydroxy amide and boric acid until the temperature reaches above 100° C. when the water of reaction distills over. As soon as all the boric acid has gone into solution the reaction is completed in vacuo at a final temperature of about 180° C.

These boric acid derivatives react quantitatively with the common sulfonating agents to produce water soluble products, which when properly neutralized, have excellent wetting, emulsifying, foaming and detergent properties.

The following examples will serve to illustrate my invention, the parts being by weight:

*Example 1.*—One mol of coconut oil fatty acid is reacted with one mol of iso propanol amine. The ortho boric acid ester is then sulfonated at 35° C. with one mol of sulfuric acid. The sulfate is then neutralized with caustic soda solution and finished to form a white paste containing 50% water. The product has exceptional detergent properties and is three to four times as efficient as soap.

*Example 2.*—210 lbs. of coconut oil fatty acid are reacted with 75 lbs. of mono ethanol amine to form the fatty ethanol amide. The fatty ethanol amide is then mixed with 62 lbs. of boric acid and the mixture is slowly heated until the water distills over, whereupon the temperature is gradually raised to 200° C. under a vacuum of 5 cm. The product is then cooled and treated with sulfuric acid to form the water soluble sulfonate. The neutralized product is an excellent scouring agent for textiles.

*Example 3.*—1 mol of xylylstearic acid is reacted with 1 mol of monoethanolamine to form the hydroxy amide. The hydroxy amide thus obtained is reacted with enough boric acid to form the ortho boric acid ester and then sulfonated at 35° to 50° C. with an equal weight of monohydrate. The raw sulfate is then neutralized with caustic soda solution and finished to form a paste containing 50% water. The resulting product has excellent wetting as well as emulsifying properties.

*Example 4.*—284 pounds of stearic acid are reacted with 121 pounds of trimethylol aminomethane to form the trihydroxy amide which is then reacted with 1 mol of boric acid. The resulting compound is sulfonated with 1 mol of 100% sulfuric acid and neutralized with caustic soda. This compound has very useful detergent properties, especially at higher temperatures.

*Example 5.*—1 mol of coconut oil fatty acid is reacted with 1 mol of 2-amino-2-methyl-1,3-propanediol to form a yellow liquid, 3 mols of this dihydroxy amide are reacted with 2 mols of boric acid and the resulting compound treated with monohydrate to form a water-soluble derivative.

*Example 6.*—420 pounds coconut oil fatty acid are reacted with 104 pounds of hydroxy ethyl ethylene diamine to form the hydroxy diamide. The hydroxy group of the above derivative is then reacted with boric acid to form the ester. The resulting compound is then sulfated and neutralized as in the previous examples. When derivatives are made of the borated alkylol amides, the treatment of such borated amides with polybasic inorganic compounds such as monohydrate, chlorsulphonic, and sulphurtrioxide yields compounds which contain sulphate and also sulphonate groups, the proportion of the latter varying with the degree of saturation of the fatty borated alkylol amide.

These sulfonated and sulfated boric acid ester amides may be used in place of soap, sulphonated oils, sulphonated alcohols, etc. in any industry where these substances are now employed regardless of the purposes for which they are used.

The term "alkylol amide" as used in the description and claims refers to alkylol amides having primary alcohol groups, secondary alcohol groups, or both, and the borating of the alcohol groups refers to the borating of either primary or secondary alcohol groups, or both, depending upon the particular alkylol amide treated.

While I have described specific novel surface active anionic compounds of amino alcohols and their method of manufacture, it is obvious that changes in the compounds and the manufacturing procedure may be made to suit different textile treatment requirements, without departing from the spirit and the scope of the appended claims.

I claim:

1. The sulphation product of a boric acid ester of an aliphatic iso alkylol amide which has at least twelve carbon atoms in the amide molecule.

2. The sulphation product of a boric acid ester of an alkylol amide having at least twelve carbon atoms in the amide molecule.

3. The sulphation product of a boric acid ester of an alkylol amide having a secondary alcohol group and having at least twelve carbon atoms in the molecule.

4. The process of manufacturing sulphation products, comprising treating an alkylol amide containing at least twelve carbon atoms in the molecule with boric acid to form a boric acid ester of said amide, and sulphating and neutralizing said ester to produce a water soluble product.

5. As an amido compound, a compound having the formula: $R_1C:O-NH-R_2-CHOX-R_3$ where $R_1$ contains at least eight carbon atoms, where $R_2$ is a low molecular weight aliphatic group and $R_3$ is hydrocarbon group and X includes a boric acid group.

6. As a surface active anionic compound of an amino alcohol, a soluble salt of a sulphated and borated alkylol amide of a relatively high molecular weight carboxylic acid having at least eight carbon atoms, said compound being useful as an assistant in textile, leather, and allied industries.

7. As a surface active anionic compound of an amino alcohol, a sodium salt of a sulphated and borated iso alkylol amide of a relatively high molecular weight fatty acid having at least eight carbon atoms, said compound being useful as an assistant in textile, leather, and allied industries.

8. A process of making surface active anionic compounds of amino alcohols which comprises condensing together an alkylol amine and a relatively high molecular weight carboxylic acid having at least eight carbon atoms to form an alkylol amide and then borating the alcohol group of the amide and finally sulphating with sulphuric acid, whereby there is obtained a material useful as an assistant in the textile, leather, and allied industries.

9. In the manufacture of surface active anionic compounds of amino alcohols, the steps of borating the alcohol group of an alkylol amide having at least eight carbon atoms and sulphating the resulting product.

JACOB KATZ.